US009591098B2

United States Patent
Oran et al.

(10) Patent No.: US 9,591,098 B2
(45) Date of Patent: Mar. 7, 2017

(54) SYSTEM AND METHOD TO REDUCE STREAM START-UP DELAY FOR ADAPTIVE STREAMING

(75) Inventors: David R. Oran, Acton, MA (US); Ali C. Begen, London (CA); Joshua B. Gahm, Newtonville, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 209 days.

(21) Appl. No.: 13/363,933

(22) Filed: Feb. 1, 2012

(65) Prior Publication Data

US 2013/0198322 A1    Aug. 1, 2013

(51) Int. Cl.
*G06F 15/173* (2006.01)
*H04L 29/08* (2006.01)
*H04N 21/2662* (2011.01)
*H04N 21/44* (2011.01)
*H04N 21/238* (2011.01)
(Continued)

(52) U.S. Cl.
CPC ..... *H04L 67/322* (2013.01); *H04N 21/23805* (2013.01); *H04N 21/2662* (2013.01); *H04N 21/44004* (2013.01); *H04N 21/6377* (2013.01); *H04L 65/4092* (2013.01)

(58) Field of Classification Search
CPC ....... H04L 2012/5684; H04L 29/06469; H04L 49/9047; H04L 65/4092; H04L 67/322; H04N 21/23805; H04N 21/6377; H04N 21/44004; H04N 21/2662; H04Q 2213/13522; H04Q 2213/13561; H04Q 3/0091

USPC ....... 709/203, 217, 219, 223–224, 232, 235; 370/235; 710/57
See application file for complete search history.

(56) References Cited

U.S. PATENT DOCUMENTS 5,553,061 A * 9/1996 Waggener et al. ........ 250/491.1
6,065,060 A   5/2000 Liu et al.
(Continued)

FOREIGN PATENT DOCUMENTS

EP        1622385       2/2005
WO    WO2006/004472    1/2006
(Continued)

OTHER PUBLICATIONS

U.S. Appl. No. 13/679,413, filed Nov. 16, 2012, entitled "System and Method for Providing Alignment of Multiple Transcoders for Adaptive Bitrate Streaming in a Network Environment," Inventors: Gary K. Shaffer, et al.
(Continued)

*Primary Examiner* — Oanh Duong
(74) *Attorney, Agent, or Firm* — Patent Capital Group (57) ABSTRACT

A method is provided in one example embodiment and includes communicating content to a content receiver, where a first portion of the content has a first drop priority. The method also includes determining a buffer status for a buffer at the content receiver, and adjusting the first drop priority to a second drop priority for a second portion of the content based on the buffer status. In more particular embodiments, the second drop priority can be higher than the first drop priority of the first portion of the content if the buffer is full or above a threshold. Also, the second drop priority can be lower than the first drop priority of the first portion of the content if content in the buffer has not started to render.

20 Claims, 6 Drawing Sheets

(51) Int. Cl.
*H04N 21/6377* (2011.01)
*H04L 29/06* (2006.01)

(56) References Cited

U.S. PATENT DOCUMENTS

| | | | | |
|---|---|---|---|---|
| 6,167,030 | A * | 12/2000 | Kilkki et al. | 370/236 |
| 6,345,307 | B1 | 2/2002 | Booth | |
| 6,493,386 | B1 | 12/2002 | Vetro et al. | |
| 6,542,546 | B1 | 4/2003 | Vetro et al. | |
| 6,804,198 | B1 * | 10/2004 | Iwamoto | 370/235 |
| 7,245,586 | B2 * | 7/2007 | Bitar et al. | 370/235 |
| 7,961,607 | B2 * | 6/2011 | De Cnodder et al. | 370/230 |
| 8,301,982 | B2 | 10/2012 | Ver Steeg et al. | |
| 8,903,411 | B1 * | 12/2014 | Reeves et al. | 455/452.2 |
| 9,148,386 | B2 | 9/2015 | Gahm et al. | |
| 2001/0026555 | A1 * | 10/2001 | Cnodder et al. | 370/412 |
| 2001/0047517 | A1 | 11/2001 | Christopoulos et al. | |
| 2003/0004998 | A1 | 1/2003 | Datta | |
| 2003/0030752 | A1 | 2/2003 | Begeja et al. | |
| 2003/0236904 | A1 | 12/2003 | Walpole | |
| 2004/0042477 | A1 * | 3/2004 | Bitar et al. | 370/412 |
| 2004/0186877 | A1 * | 9/2004 | Wang et al. | 709/200 |
| 2005/0055712 | A1 | 3/2005 | Whyte et al. | |
| 2006/0095515 | A1 | 5/2006 | Forstadius | |
| 2007/0008986 | A1 * | 1/2007 | Xie et al. | 370/412 |
| 2007/0022185 | A1 | 1/2007 | Hamilton et al. | |
| 2007/0033623 | A1 | 2/2007 | Fredrickson et al. | |
| 2007/0162568 | A1 | 7/2007 | Gupta | |
| 2007/0280232 | A1 | 12/2007 | Dec et al. | |
| 2008/0025230 | A1 | 1/2008 | Patel et al. | |
| 2008/0123660 | A1 | 5/2008 | Sammour et al. | |
| 2008/0263219 | A1 * | 10/2008 | Bacchi et al. | 709/231 |
| 2008/0267222 | A1 | 10/2008 | Leung et al. | |
| 2009/0055417 | A1 | 2/2009 | Hannuksela | |
| 2009/0307367 | A1 * | 12/2009 | Gigliotti | 709/231 |
| 2011/0072148 | A1 | 3/2011 | Begen et al. | |
| 2011/0082924 | A1 | 4/2011 | Gopalakrishnan | |
| 2011/0087794 | A1 | 4/2011 | Li et al. | |
| 2011/0090897 | A1 | 4/2011 | Johnson | |
| 2011/0090953 | A1 | 4/2011 | Melnyk et al. | |
| 2011/0138020 | A1 | 6/2011 | Pantos et al. | |
| 2011/0141885 | A1 * | 6/2011 | Chen | 370/229 |
| 2011/0225303 | A1 | 9/2011 | Engebretson et al. | |
| 2011/0268181 | A1 | 11/2011 | Joshi | |
| 2011/0289538 | A1 | 11/2011 | Begen et al. | |
| 2011/0292981 | A1 | 12/2011 | Kihara et al. | |
| 2012/0013748 | A1 * | 1/2012 | Stanwood et al. | 348/192 |
| 2012/0106342 | A1 | 5/2012 | Sundararajan et al. | |
| 2012/0144288 | A1 * | 6/2012 | Caruso et al. | 715/234 |
| 2012/0163427 | A1 | 6/2012 | Kim | |
| 2012/0173594 | A1 * | 7/2012 | Jogand-Coulomb et al. | 707/812 |
| 2012/0195201 | A1 * | 8/2012 | Ishikawa | 370/235.1 |
| 2012/0254456 | A1 | 10/2012 | Visharam et al. | |
| 2012/0263241 | A1 | 10/2012 | Swenson | |
| 2013/0044803 | A1 | 2/2013 | Fisher et al. | |
| 2013/0262693 | A1 | 10/2013 | Phillips et al. | |

FOREIGN PATENT DOCUMENTS

| | | |
|---|---|---|
| WO | WO2011/015243 | 2/2011 |
| WO | WO2012/030175 | 3/2012 |
| WO | WO2012/145108 | 10/2012 |
| WO | WO2013/116554 | 8/2013 |
| WO | WO2014/178996 | 11/2014 |
| WO | WO2015/054395 | 4/2015 |

OTHER PUBLICATIONS

U.S. Appl. No. 13/873,589, filed Apr. 30, 2013, entitled "Managing Bandwidth Allocation Among Flows Through Assignment of Drop Priority," Inventor(s): Joshua B. Gahm, et al.

U.S. Appl. No. 13/869,811, filed Apr. 24, 2013, entitled "Size Prediction in Streaming Environments," Inventors: Matthew Francis Caulfield, et al.
USPTO Dec. 7, 2012 Non-Final Office Action from U.S. Appl. No. 13/088,927.
USPTO Mar. 7, 2013 Response to Dec. 7, 2012 Non-Final Office Action from U.S. Appl. No. 13/088,927.
USPTO Jul. 2, 2013 Final Office Action from U.S. Appl. No. 13/088,927.
USPTO Oct. 2, 2013 RCE Response to Jul. 2, 2013 Final Office Action from U.S. Appl. No. 13/088,927.
USPTO Sep. 9, 2013 Non-Final Office Action from U.S. Appl. No. 13/348,094.
PCT Jun. 13, 2013 International Search Report and Written Opinion from International Application Serial No. PCT/US2013/024197 10 pages.
PCT-Jun. 14, 2012 International Search Report and Written Opinion from International Application Serial No. PCT/US2012/029691 10 pages.
Krishnan, R., et al., "Traffic management models for http adaptive-streaming-aware CDN Interconnection," CDNI Internet Draft draft-krishnan-cdni-tm-has-00.txt; XP015086619, Jul. 30, 2012, 9 pages.
PCT Aug. 5, 2014 International Preliminary Report on Patentability from International Application Serial No. PCT/US2013/024197 7 pages.
PCT Jul. 16, 2014 International Search Report and Written Opinion of the International Searching Authority from International Application Serial No. PCT/US2014/033058.
Shin, J., et al., "Content-Based Packet Video Forwarding Mechanism in Differentiated Service Networks," Proceedings of Packet Video Workshop '2000, Cagliari, Italy, May 2000; XP002317790, 10 pages; http://www.gta.ufrj.br/diffserv/2000pv-diffvideo.pdf.
USPTO Aug. 5, 2014 Notice of Allowance from U.S. Appl. No. 13/348,094.
PCT Jan. 22, 2015 International Search Report and Written Opinion of the International Searching Authority from International Application Serial No. PCT/US2014/059709.
USPTO Jan. 20, 2015 Non-Final Office Action from U.S. Appl. No. 13/873,589.
PCT Nov. 3, 2015 International Preliminary Report on Patentability from International Application Serial No. PCT/US2014/033058.
USPTO Jul. 16, 2015 Non-Final Office Action from U.S. Appl. No. 13/679,413.
USPTO Dec. 14, 2015 Final Office Action from U.S. Appl. No. 13/679,413.
USPTO May 20, 2015 Non-Final Office Action from U.S. Appl. No. 13/873,589.
USPTO Jul. 6, 2015 Non-Final Office Action from U.S. Appl. No. 13/869,811.
USPTO Feb. 1, 2016 Final Office Action from U.S. Appl. No. 13/869,811.
PCT Apr. 12, 2016 IPRP and Written Opinion from International Application Serial No. PCT/US2014/059709.
PRC Feb. 2, 2016 SIPO First Office Action from Chinese Application Serial No. CN201280018976.
PRC Aug. 10, 2016 SIPO Second Office Action from Chinese Application Serial No. CN201280018976.
USPTO Sep. 30, 2016 Non-Final Office Action from U.S. Appl. No. 13/679,413.
USPTO Jul. 6, 2016 Non-Final Office Action from U.S. Appl. No. 13/869,811.
USPTO Jun. 10, 2016 Non-Final Office Action from U.S. Appl. No. 14/051,234.
U.S. Appl. No. 13/088,927, filed Apr. 11, 2011 entitled "System and Method for Data Streaming in a Computer Network," Inventors: Robert D. Major, et al.
U.S. Appl. No. 13/348,094, filed Jan. 11, 2012 entitled "System and Method for Obfuscating Start-Up Delay in a Linear Media Service Environment," Inventors: Scott C. Labrozzi, et al.
Adobe Systems Incorporated, "Flexible delivery of on-demand and live video streaming," © 2011, 3 pages, http://www.adobe.com/products/httpdynamicstreaming/.

(56) References Cited

OTHER PUBLICATIONS

Pantos, R., "HTTP Live Streaming," Informational Internet Draft, Nov. 19, 2010, 23 pages, http://tools.ietf.org/html/draft-pantos-http-live-streaming-05.

Cisco Press Release, "Cisco and Service Providers Aim to Reinvent the TV Experience with Videoscape," Cisco Systems, Jan. 5, 2011, Las Vegas, NV http://newsroom.cisco.com/press-release-content?type=webcontent&articleId=5856789.

Cisco Systems, "Videoscape Unity: The Future of Television," 2 pages [Retrieved and printed Oct. 2, 2013] http://www.cisco.com/en/US/netsol/ns1043/networking_solutions_market_segment_solution.html.

Ibanez, J., et al., "Preliminary Simulation Evaluation of an Assured Service," IETF Internet Draft, <draft-ibanez-diffserv-assured-eval-oo.txt>, Aug. 1998, 20 pages http://tools.ietf.org/html/draft-ibanez-diffserv-assured-eval-00.

ISO/IEC 13818-1 International Standard, "Information Technology—Generic Coding of Moving Pictures and Associated Audio Information: Systems," Dec. 1, 2000, ©ISO/IEC 2000; printed in Switzerland; 174 pages.

MPEG Transport Stream from Wikipedia, the free encyclopedia; 7 pages, Sep. 6, 2012, http://enwikipedia.org/wiki/MPEG_transport_stream.

Neglia, Giovanni, et al., "An Analytical Model of a new Packet Marking Algorithm for TCP Flows," Elsevier Science, Sep. 12, 2005, 28 pages http://www-sop.inria.fr/members/Giovanni.Neglia/publications/neglia06comnet.pdf.

Pantos, R., "HTTP Live Streaming," Informational Internet Draft, Sep. 30, 2011, 34 pages, http://tools.ietf.org/html/draft-pantos-http-live-streaming-07.

PCT-Oct. 22, 2013 International Preliminary Report on Patentability from International Application Serial No. PCT/US2012/029691 10 pages.

U.S. Appl. No. 14/051,234, filed Oct. 13, 2013, entitled "Virtual Assets for On-Demand Content Generation," Inventor(s) Mahesh Vittal Viveganandhan, et al.

USPTO Nov. 8, 2013 Notice of Allowance from U.S. Appl. No. 13/088,927.

USPTO Jan. 27, 2014 Final Office Action from U.S. Appl. No. 13/348,094.

MPEG-2 from Wikipedia, the free encyclopedia; 32 pages, Sep. 6, 2012, http://en.wikipedia.org/wiki/MPEG-2.

PRC Jul. 27, 2016 SIPO First Office Action from Chinese Application Serial No. 201380007598.

\* cited by examiner

SYSTEM AND METHOD TO REDUCE STREAM START-UP DELAY FOR ADAPTIVE STREAMING

TECHNICAL FIELD

This disclosure relates in general to the field of communications and, more particularly, to a system and a method to reduce stream start-up delay for adaptive streaming.

BACKGROUND

End users have more media and communications choices than ever before. A number of prominent technological trends are currently afoot (e.g., more computing devices, more online video services, more Internet video traffic), and these trends are changing the media delivery landscape. Separately, these trends are pushing the limits of capacity and, further, degrading the performance of video, where such a degradation creates frustration amongst end users, content providers, and service providers. In many instances, the video data sought for delivery is dropped, fragmented, delayed, or simply unavailable to certain end users. Compared to legacy analog broadcast systems, start-up time for video streams can also be substantially longer leading to an inferior user experience. Hence, there is a challenge in providing an appropriate response strategy for these problematic network scenarios.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes communicating content to a content receiver, where a first portion of the content has a first drop priority. The method also includes determining (which includes any type of evaluating, examining, analyzing, etc.) a buffer status for a buffer at the content receiver, and adjusting the first drop priority to a second drop priority for a second portion of the content based on the buffer status. In more particular embodiments, the second drop priority can be higher than the first drop priority of the first portion of the content if the buffer is full or above a threshold. Also, the second drop priority can be lower than the first drop priority of the first portion of the content if content in the buffer has not started to render.

In yet other embodiments, the method may include assigning a weight factor that is used to select the first drop priority, where the weight factor is based on the buffer status. In certain implementations, the weight factor is provided as a number, which represents a fraction of packets in the content to be sent using a high drop priority. The determination of the buffer status may include determining if the content is being received faster than the buffer is emptying other content.

Other example implementations may include authenticating and authorizing the content receiver before the content is received at the content receiver. Other example methodologies can include receiving a request for certain content from a particular content receiver, where the request includes uniform resource locator (URL) parameters provided in conjunction with a particular buffer status for a particular buffer at the particular content receiver. Additionally, the method may include evaluating a plurality of content receivers, and assigning a lowest drop priority to a subset of the plurality of content receivers based on their respective encoding rates. Certain alternative embodiments may include evaluating information provided by a particular content receiver; determining that false information was previously provided by the particular content receiver for its buffer state; and assigning a certain drop priority for the particular content receiver that is different from a drop priority requested by the particular content receiver.

Example Embodiments

Figure 1A:
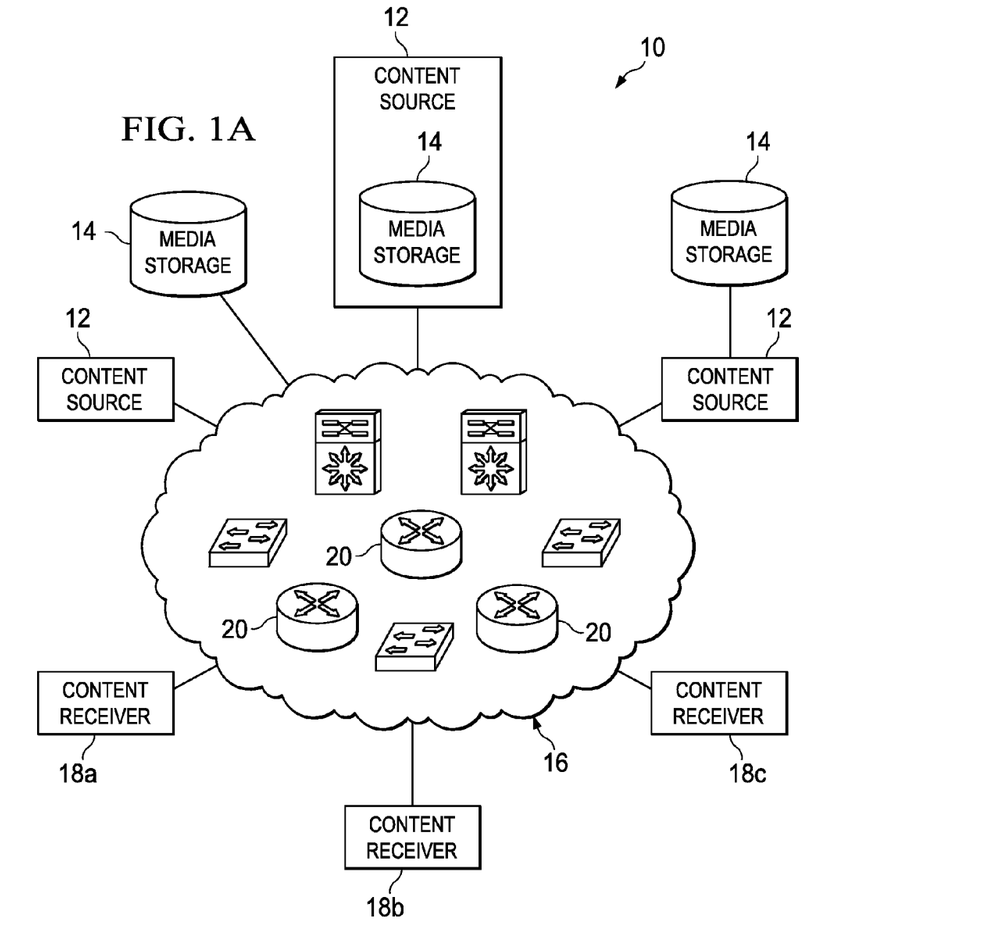
FIG. 1A is a simplified block diagram of a communication system to reduce stream start-up delay for adaptive streaming in accordance with one embodiment of the present disclosure.

Turning to FIG. 1A, FIG. 1A is a simplified block diagram of a communication system 10 configured for reducing stream start-up delay for adaptive streaming in accordance with one embodiment of the present disclosure. Communication system 10 includes a plurality of content sources 12, a plurality of media storages 14, a network 16, a plurality of content receivers 18a-c, and a plurality of routers 20. Content source 12 is configured to deliver requested content to content receivers 18a-c. The content may include any suitable information and/or data that can propagate in the network, where such information may be stored in media storage 14, which can be provisioned anywhere in the network. Media storage 14 may be a part of content source, connected to content source, suitably accessed using network 16, etc.

Communication system 10 can be configured to provide downloading and streaming capabilities associated with data services. Communication system 10 can also offer the ability to manage content for mixed-media offerings, which may combine video, audio, games, applications, channels, and programs into digital media bundles. In one particular instance, communication system 10 may be configured to reduce stream start-up delay for adaptive streaming by redirecting scarce bandwidth from streams that have adequate buffering to fill their buffers more slowly (without stalling). By reducing the bandwidth to some streams, extra bandwidth may be provided to streams starting up.

More specifically, a distribution source can use a combination of in-network traffic management, content receiver-based adaptation algorithms, and server traffic classifications to reduce the initial buffering time. These can be achieved without introducing problematic pathologies into the system such as unfair operation, inabilities to achieve an optimal rate mix among content receivers, congestion collapsing of network elements, etc. Communication system 10 can operate in either over-the-top or "managed" environments. One example case may involve a degree of cooperation and mutual trust among content receivers. Another example case may leverage ancillary system elements such that content receivers can be authenticated, authorized, and suitably monitored to detect and prevent cheating, as discussed below.

For purposes of illustrating certain example techniques of communication system 10, it is important to understand the communications that may be traversing the network. The following foundational information may be viewed as a basis from which the present disclosure may be properly explained. Adaptive Streaming Video systems make use of multi-rate video encoding and an elastic IP transport protocol suite (typically hypertext transfer protocol/transmission control protocol/Internet protocol (HTTP/TCP/IP)) to deliver high quality streaming video to a multitude of simultaneous users under widely varying network conditions. These systems are typically employed for "over-the-top" video services, where neither the network paths nor the quality of service over those paths can be controlled by the source or the sink of the video. However, because of their ubiquity and flexibility, they are also being used for managed video services, where the network is carefully traffic engineered and the content receivers and servers are sized for the load.

In adaptive streaming, the source video is encoded such that the same content is available for streaming at a number of different rates (this can be via either multi-rate coding, such as H.264 AVC, or layered coding, such as H.264 SVC). The video can be divided into "chunks" of a group-of-pictures (GOP) or more; typically two (2) to ten (10) seconds of length. Content receivers can access chunks stored on servers (or produced in near-real time for "live" streaming) using a Web paradigm (e.g., HTTP GET operations over a TCP/IP transport), and depend on the reliability, congestion control, and flow control features of TCP/IP for data delivery. Content receivers can indirectly observe the performance of the streaming fetch operations by monitoring the delivery rate and/or the fill level of their buffers and, further, either upshift to a higher encoding rate to obtain better quality when bandwidth is available, or downshift in order to avoid buffer under-runs and the consequent video stalls when available bandwidth decreases.

Compared to inelastic systems such as classic cable TV or broadcast services, adaptive streaming systems use significantly larger amounts of buffering to absorb the effects of varying bandwidth from the network. They also typically operate in a "greedy" mode: competing with each other and with other network traffic for available bandwidth. Because of the need to avoid stalls, the initial buffering period can be long when a new stream is started, or when a forward or backward skip in the content happens; this can be approximately a few seconds or longer when congestion occurs.

In accordance with one example implementation of the present disclosure, communication system 10 can resolve the aforementioned issues (and potentially others) associated with reducing stream start-up delay for adaptive streaming. Content receivers, servers (e.g., content source 12), and the network cooperate to shift bandwidth from streams already rendering video, including those operating in steady state and those with a full-enough buffer to upshift to a higher-rate encoding, to those just starting to render video. When the network is under-loaded, the new streams can ramp up quickly without depleting the buffers of other content receivers. However, when the network is heavily loaded, these streams would slow down (due to TCP congestion control dynamics).

In an embodiment, differential drop priorities (e.g., a Diffsery QoS capability) are used, where routers supporting Diffsery (e.g., routers 20) have a number of service classes (within each of which, packets can be assigned varying levels of drop priority). Under light load, the packets are forwarded, but under congestion conditions, routers deterministically drop packets with a higher drop priority within a given traffic class in preference to those with a lower drop priority. Since the streams can be adaptive bit rate (ABR) using HTTP/TCP/IP as the protocol suite, this causes the TCP connections with outstanding packets of higher drop priority to see losses and reduce their congestion window size. This effectively cuts their bandwidth usage, which in turn opens up capacity that can be absorbed by the streams running at lower drop priority. These streams, seeing more available bandwidth, speed up through normal TCP dynamics. This technique of using multiple drop priorities within a single service class is quite different from methods that put packets of the same stream in different service classes. TCP can interact poorly with multiple service classes on a single connection, as mis-ordering introduced by multiple service classes can result in TCP misidentifying this as loss and, further, cause a large drop in the effective throughput of the TCP connections.

In an embodiment, packets for various stream chunks are transmitted by a server at different drop priorities based on a stream state at the content receiver side. For example, Diffsery classes can allow three drop priorities per class. There are a number of possible mappings of stream state to drop priority and the mappings can vary based on how many drop priorities are available.

In one example, where three drop priorities are available, the first drop priority may be chosen strictly based on content receiver buffer fullness. When the buffer is less than one-third ($\frac{1}{3}$) full, the server transmits packets at the lowest drop priority. When the buffer is between one-third ($\frac{1}{3}$) to two-thirds ($\frac{2}{3}$) full, the server transmits packets at the intermediate drop priority. When the buffer is more than two-thirds ($\frac{2}{3}$) full, the highest drop priority is used. In an embodiment, two drop priorities may be used. In other embodiments, more than three drop priorities may be used without departing from the scope of the present disclosure.

In another example, drop priorities are chosen based on a stream state assessment at the content receiver. If the content receiver is initially filling its buffer and has not yet started rendering video, the server transmits packets at the lowest drop priority. Once the content receiver starts rendering video and has some degree of "breathing room" in its buffer, the server transmits packets at the intermediate drop priority. Once the content receiver has built up a substantial buffer and is continuing to obtain more bandwidth than needed to sustain the current encoding rate (and might upshift to a higher encoding rate), the server transmits packets at the highest drop priority.

In another example, drop priorities are statistically chosen by the server (e.g., content source 12) on a packet-by-packet basis, selecting among the available drop priorities based on a weight value that depends on the buffer state of the content receiver. For example, a weight value, "w", is a number between zero (0) and one (1), which represents the fraction of packets to be sent using the high drop priority, with the remaining packets being sent at the low drop priority. The weight value is calculated based on the buffer fullness of the content receiver, with a weight of zero (0) being used when the buffer is empty, a weight of one (1) being used when the buffer is full, and intermediate values of "w" being used for intermediate levels of buffer fullness. In addition to using fewer drop priorities than the other embodiments discussed herein, this particular embodiment has the advantage that the average bandwidth seen by the content receiver becomes a continuous function of its buffer fullness rather than a step function. Smoothing the relationship between buffer fullness and bandwidth, in turn, may make a content receivers' rate adaptation algorithms more stable.

The overall effect of assigning drop priorities is that new stream starts are given an "extra bandwidth boost" when load is high by having packet drops concentrated on streams that have the most "headroom" to slow down without draining their buffers. When there is enough load to fill the available bandwidth (under steady state), the process has the effect of keeping all the streams at or near the midpoint of their buffering space, penalizing streams that "get ahead" and go into a buffering region where an upshift might occur, and preferring streams whose buffers are depleted (as well as those building up their initial buffers). While not entirely "flow fair" in the TCP sense, the scheme provides a more useful form of stream fairness.

The granularity of the packet to drop priority mapping, while it could be on each transmitted packet, only needs to be at the granularity of the video chunks requested. The granularity of the video chunks requested by the content receivers is the minimal adaptation granularity that content receivers may be capable of because the transactional closed loop between content receivers and servers is at the chunk level and not at the TCP adaptation level. This allows for stability and adaptability when common chunk sizes of data are used (e.g., chunk sizes of two (2) to ten (10) seconds of video).

Given that ABR streaming systems put all adaptation policy at the content receivers rather than the servers, content receiver signaling of the stream state may be used. In an embodiment, the content receivers signal to the server as part of each chunk fetch transaction. For example, the content receivers signal their buffer depth in terms of percentage fullness. A server could then map this metric into the corresponding drop priority and transmits all packets of the requested chunk at that drop priority.

In another example, the content receivers signal their stream state as one of three conditions. The first condition is an initial fill, both pre-rendering and initial building phase up to the point of safety against stall, or emptying faster than the current encoding rate and considering a downshift to avoid a stall. The second condition is a steady state with adequate buffering at the current encoding rate. The third condition is above a buffer midpoint and filling faster than the current stream rate, such that the content receiver is considering a rate upshift.

After receiving the stream state condition, the server maps the stream states onto a corresponding low, medium, or high drop priority and subsequently transmits all packets of the requested chunk at the corresponding drop priority. For example, the first condition may be a low drop priority, the second condition may be a medium drop priority, and the third condition may be a high drop priority.

In another example, the content receivers signal either the buffer depth (in terms of percentage fullness), in which case the server calculates the value "w" (thereby, determining the proportion of packets sent at the higher drop priority), or the content receivers signal the value "w", which directly selects the proportion of packets to be sent at the higher drop priority. The server then, prior to sending each packet, calculates a random number, r, in the range [0,1], and then sends the packet at the higher drop priority if r<=w and at the lower drop priority of r>w.

In addition, there are a number of possible methods that fit into the existing HTTP/TCP adaptive streaming protocols for the content receivers to signal the information of variants. For example, the data may be signaled as uniform resource locator (URL) parameters together with the URL for the requested chunk. In another example, the data may be signaled in an HTTP header extension. In another example, the data is signaled in a multipurpose internet mail extension (MIME) object included with the HTTP GET request.

In an embodiment, there are some ways that a purely server-based approach can assess the content receiver buffering state and choose appropriate per-chunk drop priorities. Such methods may be effective by employing heuristics that can be used individually, or in combination with each other. For example, initial chunk(s) of a given piece of content can be assigned the lowest drop priority on the assumption that they are likely to constitute a new stream start. Conversely, high encoding rates can be assigned the highest drop priority based on the assumption that only content receivers operating with significant bandwidth and plentiful buffering would ask for those rates.

In another example, chunks of the lowest encoding rate can be assigned to the lowest drop priority based on the assumption that content receivers that are either starting a new stream or skipping forward/backward would drop to the lowest encoding rate. Also, content receivers newly arrived on a server (i.e., these are the first chunks being requested on the server) would receive a low drop priority based on the assumption that content receivers have reasonably strong server affinity and, further, are not doing parallel fetches from multiple (uncoordinated) servers. This may allow the server to build up a "model" of the content receiver's buffer state by tracking fetch requests and assigning drop priorities based on that model.

When content receivers using the scheme are in the same traffic class and compete only among themselves (or with traffic that is not biased in some way with respect to drop priority), the process works well. However, content receivers should not be permitted to cheat by providing misinformation about their buffering state, or otherwise convincing the server to use a lower drop priority than the content receiver should obtain. If all content receivers cheat in this manner, the system reverts to the behavior it would have employed if drop priorities were not used in the first place (since the only useful cheat for a content receiver is to cause the server to use the lowest drop priority). If some content receivers cheat and others do not, there is unfair behavior that favors the cheating content receivers.

The system can be configured such that a cheating content receiver can be mostly avoided through conventional authentication and authorization techniques. For example, if servers refuse to set drop priorities for content receivers who cannot pass authorization checks, content receivers not known to "play by the rules" (i.e., adhere to the protocol) can be excluded. If a content receiver manages to pass authorization checks and still misbehaves and attempts to cheat, there are various techniques that can be used to monitor and report such misbehavior, such as access logs, in-network monitoring of traffic by routers, anomaly detection software, etc. For example, content receiver 18a may be known to give false information about its buffer state and, as a result, content source 12 may refuse to set low drop priorities for content receiver 18a.

Turning to the example infrastructure associated with present disclosure, content receivers 18a-c can be associated with devices, customers, or end users wishing to receive data or content in communication system 10 via some network. The term 'content receiver' is inclusive of devices used to initiate a communication, such as a receiver, a computer, a set-top box, an Internet radio device (IRD), a cell phone, a smart phone, a tablet, a personal digital assistant (PDA), a Google droid, an iPhone, and iPad, or any other device, component, element, or object capable of initiating voice, audio, video, media, or data exchanges within communication system 10. Content receivers 18a-c may also be inclusive of a suitable interface to the human user, such as a display, a keyboard, a touchpad, a remote control, or other terminal equipment. Content receivers 18a-c may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Network 16 represents a series of points or nodes of interconnected communication paths for receiving and transmitting packets of information that propagate through communication system 10. Network 16 offers a communicative interface between sources and/or hosts, and may be any local area network (LAN), wireless local area network (WLAN), metropolitan area network (MAN), Intranet, Extranet, WAN, virtual private network (VPN), or any other appropriate architecture or system that facilitates communications in a network environment. A network can comprise any number of hardware or software elements coupled to (and in communication with) each other through a communications medium.

In one particular instance, the architecture of the present disclosure can be associated with a service provider digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures, and data over cable service interface specification (DOCSIS) cable television (CATV). The architecture of the present disclosure may include a configuration capable of transmission control protocol/internet protocol (TCP/IP) communications for the transmission and/or reception of packets in a network.

Figure 1B:
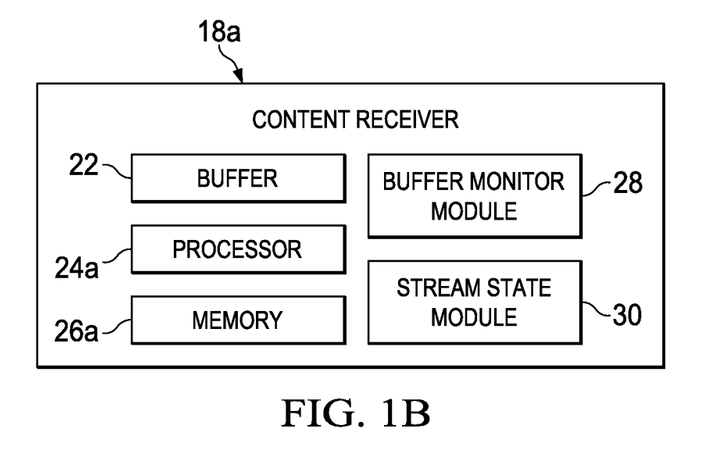
FIG. 1B is a simplified block diagram illustrating possible example details associated with one embodiment of the present disclosure.

Turning to FIG. 1B, FIG. 1B is a simplified block diagram illustrating one possible set of details associated with communication system 10. This particular configuration includes content receiver 18a. In this particular implementation, content receiver 18a includes a buffer 22, a processor 24a, a memory 26a, a buffer monitor module 28, and a stream state module 30. Buffer 22 can be configured to buffer content received at a receiver (e.g., receiver 18a). Buffer monitor module 28 can be configured to monitor buffer 22, determine a status of buffer 22, and/or determine a weight factor for buffer 22 (e.g., a percentage of buffer depth or a weight factor "w"). Stream state module 30 can be configured to monitor the state of the content stream that the receiver (e.g., receiver 18a) is receiving and determine whether or not the content is rendering.

Figure 1C:
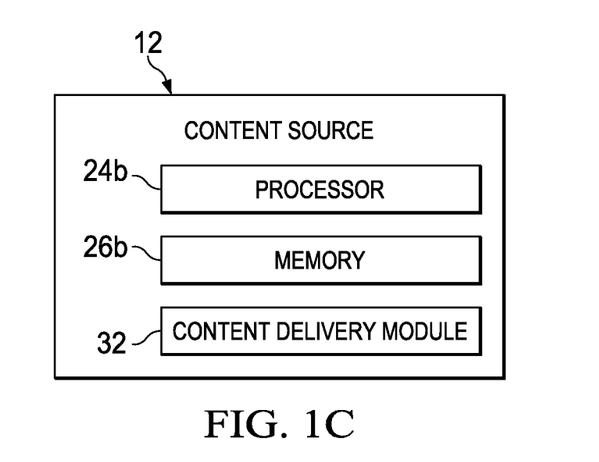
FIG. 1C is a simplified block diagram illustrating possible example details associated with one embodiment of the present disclosure.

Turning to FIG. 1C, FIG. 1C is a simplified block diagram illustrating one possible set of details associated with communication system 10. This particular configuration includes content source 12. In this particular instance, content source 12 includes a processor 24b, a memory 26b, and a content delivery module 32. Content delivery module 32 can be configured to determine the priority of packets sent to content receivers 18a-c, as discussed herein.

Content receivers 18a-c and content source 12 are network elements that can facilitate the streaming activities discussed herein. As used herein in this Specification, the term 'network element' is meant to encompass any of the aforementioned elements, as well as routers, switches, cable boxes, gateways, bridges, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, content receivers 18a-c and/or content source 12 include software to achieve (or to foster) the streaming activities discussed herein. This could include the implementation of instances of buffer monitor module 28, stream state module 30, and/or content delivery module 32. Additionally, each of these elements can have an internal structure (e.g., a processor, a memory element, etc.) to facilitate some of the operations described herein. In other embodiments, these streaming activities may be executed externally to these elements, or included in some other network element to achieve the intended functionality. Alternatively, content receivers 18a-c and content source 12 may include software (or reciprocating software) that can coordinate with other network elements in order to achieve the streaming activities described herein. In still other embodiments, one or several devices may include any suitable algorithms, hardware, software, components, modules, interfaces, or objects that facilitate the operations thereof.

Figure 2:
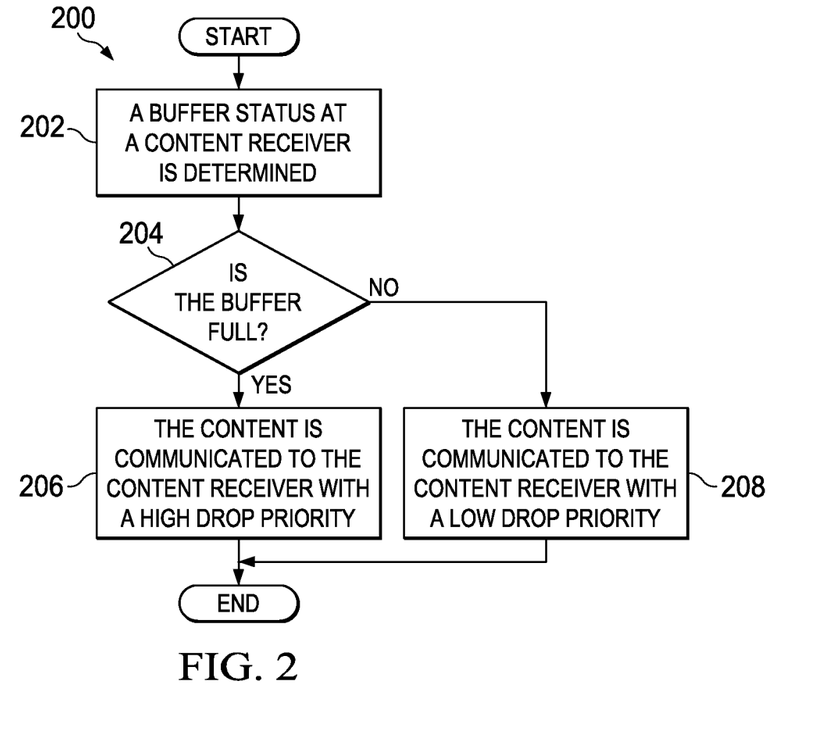
FIG. 2 is a simplified flowchart illustrating potential operations associated with the communication system in accordance with one embodiment of the present disclosure.

Turning to FIG. 2, FIG. 2 is a simplified flowchart 200 illustrating example activities associated with reducing stream start-up delay for adaptive streaming. At 202, a buffer status at a content receiver is determined. For example, the status of buffer 22 at content receiver 18a may be determined by buffer monitor module 28. At 204, the system determines if the buffer is full. For example, buffer monitor module 28 may determine if buffer 22 is full. If the buffer is nearly full, then the content is sent to the content receiver with a high drop priority, as illustrated in 206. For example, content receiver 18a may send a signal to content source 12 that buffer 22 is nearly full. In response, content delivery module 32 may place a high drop priority on the content being delivered to content receiver 18a.

If the buffer is not close to full, then the content is communicated to the content receiver with a low drop priority. For example, content receiver 18a may send a signal to content source 12 that the buffer is not full. In response, content delivery module 32 may place a low drop priority on the content being delivered to content receiver 18a.

Figure 3:
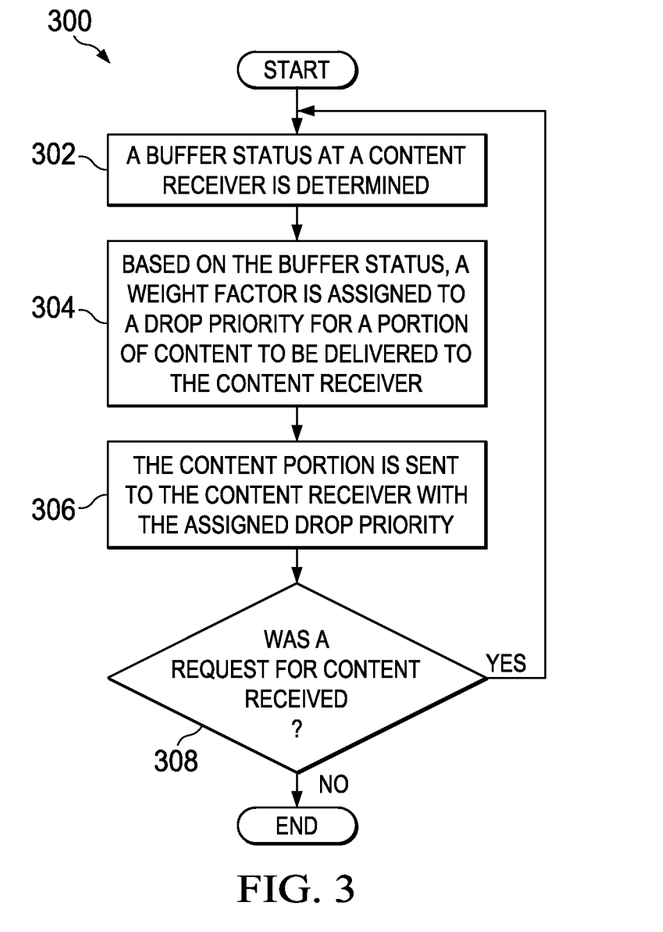
FIG. 3 is another simplified flowchart illustrating potential operations associated with the communication system in accordance with one embodiment of the present disclosure.

Turning to FIG. 3, FIG. 3 is a simplified flowchart 300 illustrating example activities associated with reducing stream start-up delay for adaptive streaming. At 302, a buffer status at a content receiver is determined. For example, the status of buffer 22 at content receiver 18a may be determined by buffer monitor module 28. At 304, based on the buffer status, a weight factor is assigned to a drop priority for a portion of content to be delivered to the content receiver. For example, based on the buffer status, buffer monitor module 28 may assign a weight factor "w" to the drop priority. In another example, buffer monitor module 28 may determine a percentage of the buffer depth (i.e., the buffer depth on a percentage basis).

At 306, the content portion can be sent to the content receiver with the assigned drop priority. For example, content delivery module 32 may receive the weight factor from content receiver 18a and use the weight factor to assign a drop priority to the content portion that is sent to the content receiver. In another example, content delivery module 32 uses the percentage of the buffer depth to determine the drop priority. At 308, the system determines if all of the content has been delivered to the content receiver. If the content has been delivered to the content receiver, then the flow ends. If not all of the content has been delivered to the content receiver, then the buffer status at the content receiver is determined, as illustrated in 302, and the flow continues.

Figure 4:
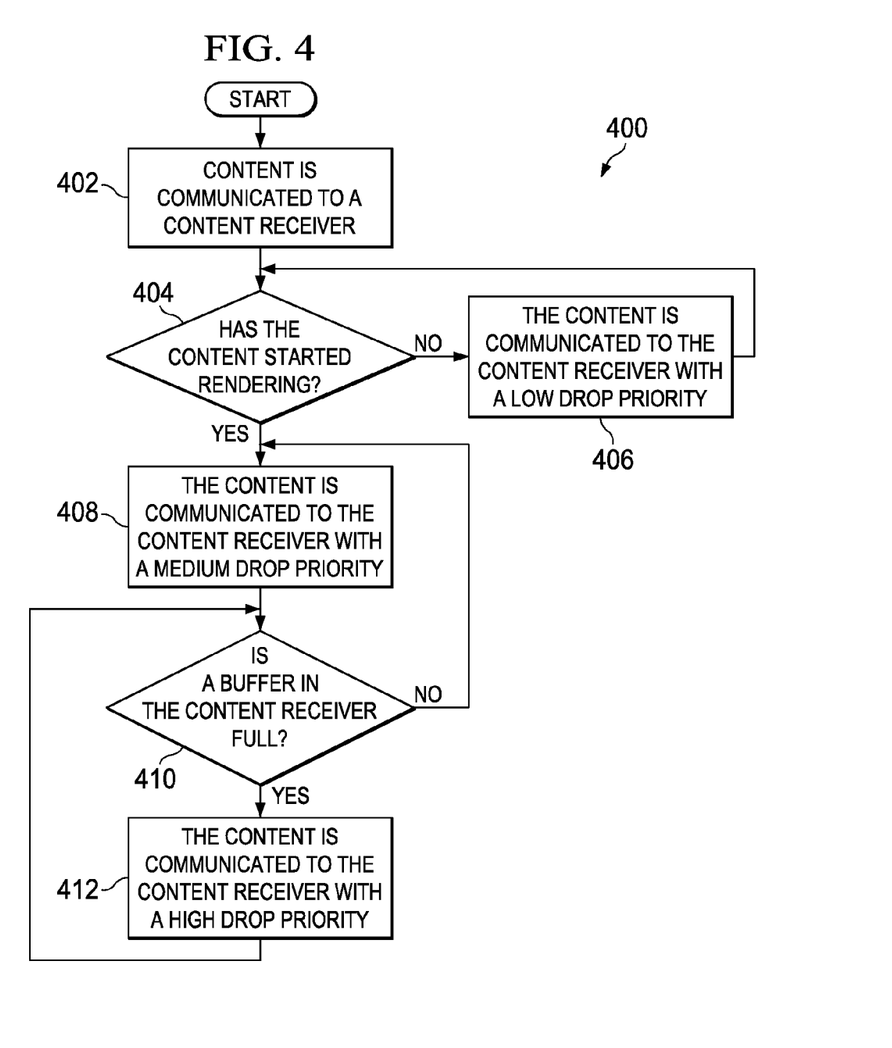
FIG. 4 is another simplified flowchart illustrating potential operations associated with the communication system in accordance with one embodiment of the present disclosure.

Turning to FIG. 4, FIG. 4 is a simplified flowchart 400 illustrating example activities associated with reducing stream start-up delay for adaptive streaming. At 402, content is communicated to a content receiver. For example, content may be communicated to content receiver 18a from content source 12. At 404, the system determines if the content has started rendering. For example, stream state module 30 may determine if the content on content receiver 18a has started rendering.

If the system determines that the content on the content receiver has not started rendering, then the content is communicated to the content receiver with a low drop priority, as illustrated in 406. If the system determines that the content on the content receiver has started rendering, then the content is communicated to the content receiver with a medium drop priority, as illustrated in 408. At 410, the system determines if a buffer in the content receiver is full. For example, buffer monitor 28 may determine if buffer 22 is full. If the buffer is not full, then the content is communicated to the content receiver with a medium drop priority, as illustrated in 408. If the buffer is full, then the content is communicated to the content receiver with a high drop priority, as illustrated in 412, and the system determines if the buffer content is full, as illustrated in 410.

Figure 5:
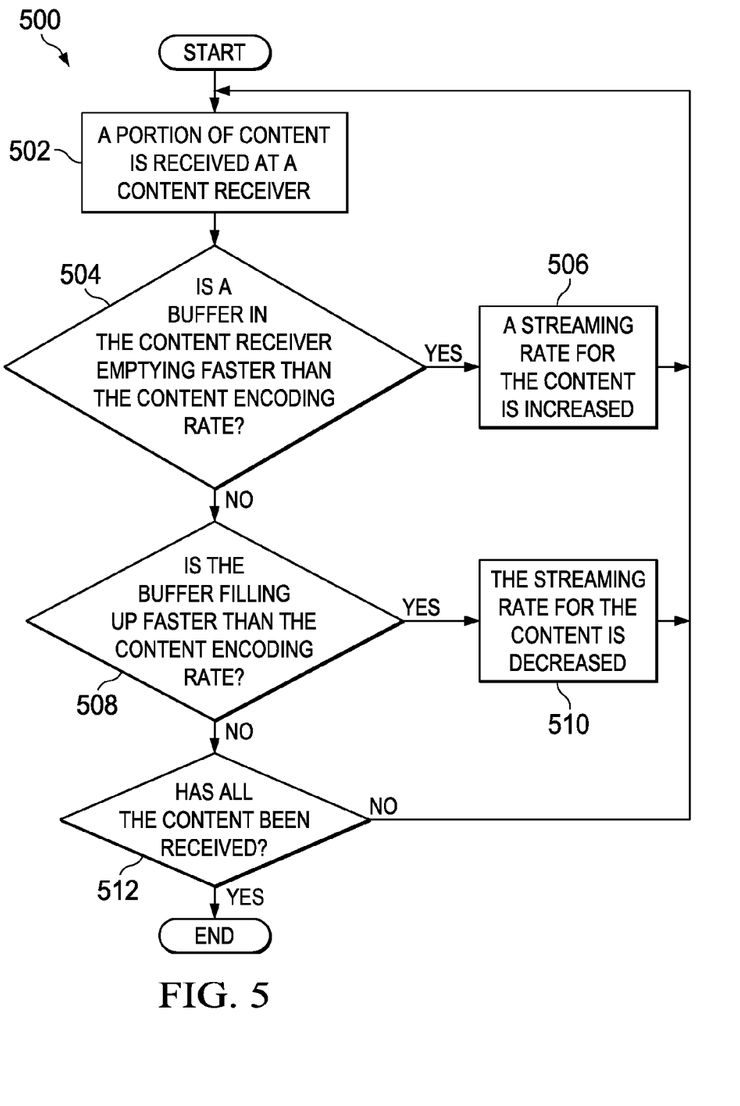
FIG. 5 is another simplified flowchart illustrating potential operations associated with the communication system in accordance with one embodiment of the present disclosure.

Turning to FIG. 5, FIG. 5 is a simplified flowchart 500 illustrating example activities associated with reducing stream start-up delay for adaptive streaming. At 502, a portion of content is received at a content receiver. For example, a portion of content may be received at content receiver 18a from content source 12. At 504, the system determines if a buffer in the content receiver is emptying faster than the content encoding rate. If the system determines that a buffer in the content receiver is emptying faster than the content encoding rate, then a streaming rate for the content is increased, as illustrated in 506 and a portion of content is received at the content receiver, as illustrated in 502. If the system determines that a buffer in the content receiver is not emptying faster than the content encoding rate, then the system determines if the buffer is filling up faster than the content encoding rate, as illustrated in 508.

If the system determines that the buffer is filling up faster than the content encoding rate, then the streaming rate for the content is decreased, as illustrated in 510, and a portion of content is received at the content receiver, as illustrated in 502. However, if the system determines that the buffer is not filling up faster than the content encoding rate, then the system determines if all of the content has been received, as illustrated in 512. If all of the content has been received, then the flow stops. If not all of the content has been received, then a portion of content is received at the content receiver, as illustrated in 502.

As identified previously, a network element can include software (e.g., buffer monitor module 28, stream state module 30, and content delivery module 32, etc.) to achieve the adaptive streaming operations, as outlined herein in this document. In certain example implementations, the adaptive streaming functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor [processors 24a and 24b shown in FIGS. 1B and 1C], or other similar machine, etc.). In some of these instances, a memory element [memory 26a and 26b shown in FIGS. 1B and 1C] can store data used for the operations described herein. This includes the memory element being able to store instructions (e.g., software, code, etc.) that are executed to carry out the activities described in this Specification. The processor (e.g., processors 24a and 24b) can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the caching of data streams as outlined herein. Additionally, each of these devices may include a processor that can execute software or an algorithm to perform the caching management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and, further, can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

It should also be noted that many of the previous discussions may imply a single client-server relationship. In reality, there are "n" servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for"are specifically used in the particular claims; and (b) does not intend, by any statement in the specification, to limit this disclosure in any way that is not otherwise reflected in the appended claims.

What is claimed is:

1. A method, comprising:
    communicating content to a content receiver, wherein a first portion of the content has a first drop priority, wherein the content receiver is one of a plurality of content receivers receiving the content;
    receiving, from the content receiver, a buffer status for a buffer at the content receiver;
    determining that the first drop priority should be adjusted to a second drop priority, wherein the determination is at least partially based on the buffer status, wherein the second drop priority is different than the first drop priority;
    determining, by a server, that false information was previously provided by the content receiver for the buffer status; and
    refusing, by the server, to adjust the first drop priority to the second drop priority based at least partially on the determination that false information was previously provided by the content receiver for the buffer status, wherein the second drop priority is a low drop priority.

2. The method of claim 1, wherein the first drop priority is higher than the second drop priority of the first portion of the content if the buffer is full or above a threshold.

3. The method of claim 1, wherein the second drop priority is lower than the first drop priority of the first portion of the content if content in the buffer has not started to render.

4. The method of claim 1, further comprising:
    assigning a weight factor that is used to select the first drop priority, wherein the weight factor is based on the buffer status.

5. The method of claim 4, wherein the weight factor is provided as a number, which represents a fraction of packets in the content to be sent using a high drop priority.

6. The method of claim 1, wherein determining the buffer status includes determining if the content is being received faster than the buffer is emptying other content.

7. The method of claim 1, further comprising:
    authenticating and authorizing the content receiver before the content is received at the content receiver.

8. The method of claim 1, further comprising:
    receiving a request for certain content from a particular content receiver, wherein the request includes uniform resource locator (URL) parameters provided in conjunction with a particular buffer status for a particular buffer at the particular content receiver.

9. The method of claim 1, further comprising:
    evaluating the plurality of content receivers; and
    assigning a lowest drop priority to a subset of the plurality of content receivers based on their respective encoding rates.

10. The method of claim 1, further comprising:
    evaluating information provided by a particular content receiver to determine that false information was previously provided by the particular content receiver for its buffer state; and
    assigning a certain drop priority for the content receiver that is different from a drop priority requested by the particular content receiver.

11. Logic encoded in one or more non-transitory media that includes instructions for execution and when executed by a processor is operable to perform operations, comprising:
    communicating content to a content receiver, wherein a first portion of the content has a first drop priority, wherein the content receiver is one of a plurality of content receivers receiving content;
    receiving, from the content receiver, a buffer status for a buffer at the content receiver,
    determining that the first drop priority should be adjusted to a second drop priority, wherein the determination is at least partially based on the buffer status;
    determining, by a server, that false information was previously provided by the content receiver for the buffer status; and refusing, by the server, to adjust the first drop priority to the second drop priority based at least partially on the determination that false information was previously provided by the content receiver for the buffer status, wherein the second drop priority is a low drop priority.

12. The logic of claim 11, wherein the first drop priority is higher than the second drop priority of the first portion of the content if the buffer is full or above a threshold.

13. The logic of claim 11, wherein the second drop priority is lower than the first drop priority of the first portion of the content if content in the buffer has not started to render.

14. The logic of claim 11, the operations further comprising:
   assigning a weight factor that is used to select the first drop priority, wherein the weight factor is based on the buffer status.

15. The logic of claim 14, wherein the weight factor is provided as a number, which represents a fraction of packets in the content to be sent using a high drop priority.

16. The logic of claim 11, the operations further comprising:
   evaluating the plurality of content receivers; and
   assigning a lowest drop priority to a subset of the plurality of content receivers based on their respective encoding rates.

17. The logic of claim 11, the operations further comprising:
   evaluating information provided by a particular content receiver to determine that false information was previously provided by the particular content receiver for its buffer state; and
   assigning a certain drop priority for the particular content receiver that is different from a drop priority requested by the particular content receiver.

18. A method, comprising:
   evaluating information provided by a particular content receiver, wherein the particular content receiver is one of a plurality of content receivers and information from one or more of the plurality of content receivers is also provided;
   determining that a first drop priority associated with the particular content receiver should be adjusted to a second drop priority;
   determining, by a server, that false information was previously provided by the particular content receiver for its buffer state; and
   refusing, by the server, to adjust the first drop priority to the second drop priority based at least partially on the determination that false information was previously provided by the content receiver for the buffer status, wherein the second drop priority is a low drop priority.

19. The method of claim 18, further comprising:
   communicating content to the content receiver, wherein a first portion of the content has the first drop priority;
   determining a buffer status for a buffer at the content receiver; and
   adjusting the first drop priority to the second drop priority for a second portion of the content based on the buffer status.

20. The method of claim 18, further comprising:
   assigning a weight factor that is used to select the first drop priority, wherein the weight factor is based on the buffer status, and wherein the weight factor is provided as a number, which represents a fraction of packets in the content to be sent using a high drop priority.

* * * * *